United States Patent
Pan (10) Patent No.: US 9,917,928 B2
(45) Date of Patent: Mar. 13, 2018

(54) NETWORK ADDRESS TRANSLATION (71) Applicant: Fortinet, Inc., Sunnyvale, CA (US)

(72) Inventor: Yixin Pan, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 146 days.

(21) Appl. No.: 14/551,442

(22) Filed: Nov. 24, 2014

(65) Prior Publication Data

US 2016/0149748 A1 May 26, 2016

(51) Int. Cl.
- *H04L 29/06* (2006.01)
- *H04L 29/12* (2006.01)
- H04L 12/935 (2013.01)
- H04L 12/931 (2013.01)

(52) U.S. Cl.
CPC .......... *H04L 69/22* (2013.01); *H04L 61/1511* (2013.01); *H04L 61/251* (2013.01); *H04L 69/08* (2013.01); *H04L 69/167* (2013.01); H04L 49/3009 (2013.01); H04L 49/602 (2013.01)

(58) Field of Classification Search
CPC .... H04L 69/167; H04L 69/08; H04L 61/2557
See application file for complete search history.

(56) References Cited

U.S. PATENT DOCUMENTS

| | | | | |
|---|---|---|---|---|
| 8,959,534 B2* | 2/2015 | Scaffidi, Jr. | ........... | H04L 69/321 719/321 |
| 2004/0076180 A1* | 4/2004 | Satapati | .............. | H04L 12/4604 370/467 |
| 2004/0139170 A1* | 7/2004 | Shen | .................... | H04L 12/2856 709/218 |
| 2004/0165602 A1* | 8/2004 | Park | ........................ | H04L 12/66 370/401 |
| 2011/0153831 A1* | 6/2011 | Mutnuru | ........... | H04L 29/12066 709/226 |
| 2013/0117554 A1* | 5/2013 | Ylonen | ..................... | H04L 9/08 713/151 |
| 2013/0318339 A1* | 11/2013 | Tola | .................... | H04L 63/0478 713/150 |

* cited by examiner

*Primary Examiner* — Xavier Szewai Wong
(74) *Attorney, Agent, or Firm* — Hamilton, DeSanctis & Cha LLP (57) ABSTRACT

Systems and methods for connecting a network using one network protocol with a network using another network protocol are provided. According to an embodiment, a method is provided for performing network address translation. A data packet is received, by a protocol bridge connecting a first network, using a first protocol, and a second network, using a second protocol, via a first session of the first protocol from a first network appliance of the first network. The first protocol may be either Internet Protocol version 4 (IPv4) or Internet Protocol version 6 (IPv6) and the second protocol is the other. The data packet is translated into the second protocol. The translation is performed in a kernel space of the protocol bridge. Finally, the data packet is transmitted via a second session of the second protocol to a second network appliance of the second network.

24 Claims, 6 Drawing Sheets

NETWORK ADDRESS TRANSLATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present invention generally relate to the field of networking. In particular, various embodiments relate to bridging an Internet Protocol version 4 (IPv4) network and an Internet Protocol version 6 (IPv6) network.

Description of the Related Art

IPv4 addresses are 32-bit Internet addresses and the IPv4 address space comprises about 4.3 billion addresses. Because of the shortage of IPv4 addresses, IPv6 addresses, which have a size of 128 bits, have begun to be used for IP networks. The full adoption of IPv6 addresses will take a long time and IPv4 addresses and IPv6 addresses will co-exist during the transition. To enable the communication between an IPv4-addressed network appliance (i.e., a network appliance on an IPv4 network) and an IPv6-addressed network appliance (i.e., a network appliance on an IPv6 network), network address translation (i.e., NAT from IPv6 to IPv4 (NAT64) and NAT from IPv4 to IPv6 (NAT46)) is used for translating data packets from one protocol to the other and send the translated data packets to the destinations.

A NAT64/46 protocol bridge comprises at least two network interface controllers (NICs), one is for connecting an IPv4 network and one is for connecting to an IPv6 network. Suppose a data packet that is being sent from an IPv6 network appliance to an IPv4 network appliance is received by a NIC of the NAT64/46 protocol bridge, an IPv6 session between the IPv6 network appliance and the NAT64/46 protocol bridge is created in a kernel space of the NAT64/46 protocol bridge. Then the data packet is sent to a NAT64/46 application in the user space to translate the IPv6 address to an IPv4 address. After the translation, an IPv4 data packet is recomposed using the translated IPv4 tuple information. The recomposed IPv4 data packet is then sent to its destination through an IPv4 session between the IPv4 network appliance and the NAT64/46 protocol bridge. Since processing data packets in user space incurs kernel space/user space context switching, it is desirable for a NAT64/46 protocol bridge to handles address translation only in kernel space.

Further, some NAT64/46 protocol bridges use a dedicate session mapping table to manage the mapping of IPv4 sessions and IPv6 sessions of each transmission protocol. It is too complicate to maintain dedicated session mapping tables in kernel space. Therefore, it is desirable to extend the system tables that are used for managing sessions between hosts of IPv4 networks and IPv6 networks to manage the mapping of IPv4 sessions and IPv6 sessions for any transmission protocols.

SUMMARY

Systems and methods are described for connecting a network using one network protocol with a network using another network protocol. According to an embodiment, a method is provided for performing network address translation. A data packet is received, by a protocol bridge connecting a first network, configured for operation in accordance with a first protocol, and a second network, configured for operation in accordance with a second protocol, via a first session of the first protocol from a first network appliance of the first network. The first protocol may be either Internet Protocol version 4 (IPv4) or Internet Protocol version 6 (IPv6). The data packet is translated by the protocol bridge into the second protocol. The second protocol may be either Internet Protocol version 4 (IPv4) or Internet Protocol version 6 (IPv6), but is different from the first protocol. The translation is performed in a kernel space of the protocol bridge without sending the data packet to a user space of the protocol bridge. Finally, the data packet is transmitted by the protocol bridge via a second session of the second protocol to a second network appliance of the second network.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for connecting a network using one network protocol with a network using another network protocol. According to an embodiment, a method is provided for receiving, by a protocol bridge connecting a first network in a first protocol and a second network in a second protocol, a data packet in a first session of the first protocol from a first network appliance of the first network, wherein the first protocol is Internet Protocol version 4 (IPv4) or Internet Protocol version 6 (IPv6). The data packet is translated into the second protocol by the protocol bridge, wherein the second protocol is IPv4 or IPv6 and is different from the first protocol and the translation is processed in a kernel space of the protocol bridge without sending the data packet to a user space of the protocol bridge. The protocol bridge sends the translated data packet in a second session of the second protocol to a second network appliance of the second network.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "protocol bridge" generally refers to an intermediary device, program or agent, which acts as a network address translator (NAT64/46) for the purpose of translating IPv4 data packets into IPv6 data packets and/or translating IPv6 data packets into IPv4 data packets and transmitting the translated data packets to their respective destinations.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

Figure 1:
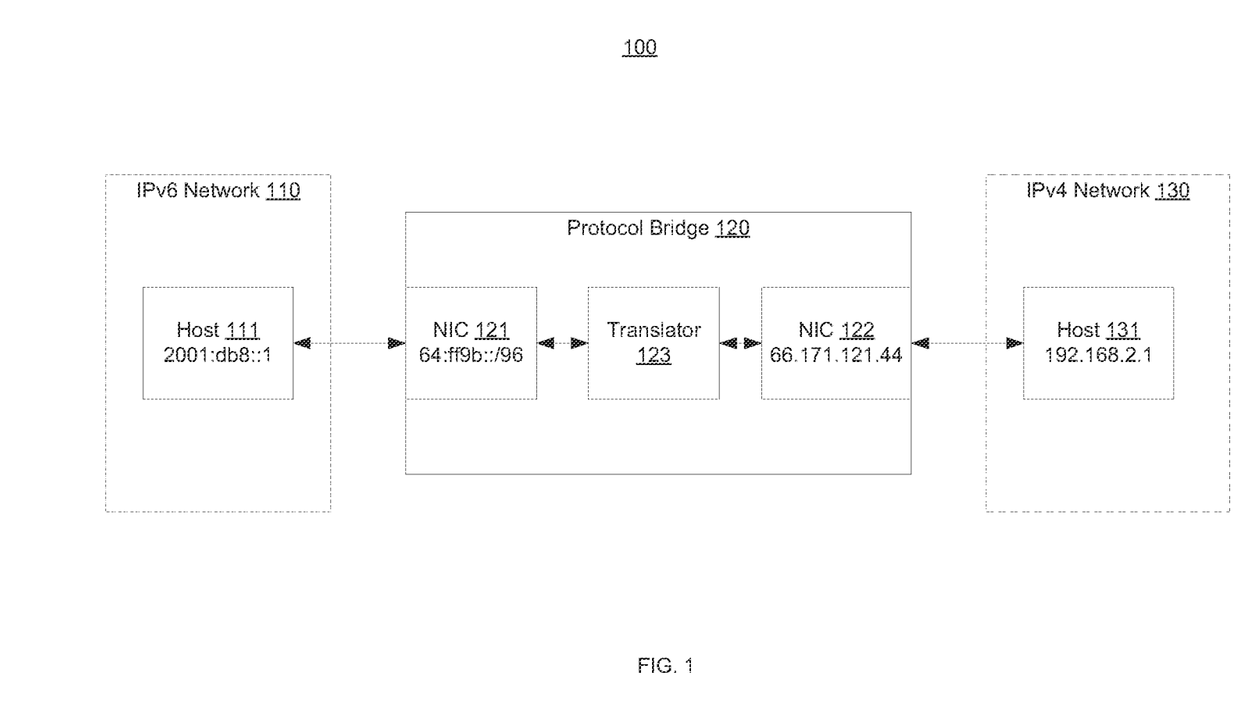
FIG. 1 illustrates an exemplary network architecture in accordance with an embodiment of the present invention.

FIG. 1 illustrates an exemplary network architecture 100 showing an IPv6 network 110, a protocol bridge 120 and an IPv4 network 130 in accordance with an embodiment of the present invention. In network architecture 100, IPv6 network 110 and IPv4 network 130 are connected by protocol bridge 120 so that an IPv6 only host 111 and an IPv4 host 131 may communicate with each other. The network may be any type of data network configured to connect multiple computing devices, such as a local area network (LAN), a wide area network (WAN), the Internet or a combination of such networks. Protocol bridge 120 is logically interposed between IPv6 network 110 and IPv4 network 130 (e.g., at the edges of both IPv6 network 110 and IPv4 network 130) and acts as a network address translator for data packets exchanged between the two networks.

In the present example, host 111 has an IPv6 address of 2001:db8::1 and host 131 has an IPv4 address of 192.168.2.1. Protocol bridge 120 includes two NICs (121 and 122) and a translator 123. NIC 121 has an IPv6 address of 64:ff9b::/96 and NIC 122 has an IPv4 address of 66.171.121.44. When host 111 and host 131 communicate with each other, an IPv6 session is established between host 111 and protocol bridge 120 through NIC 121 and an IPv4 session is established between host 131 and protocol bridge 120 through NIC 122. Data packets received in one of the IPv6 session and the IPv4 session are recomposed to the other protocol by translator 123 in a kernel (not shown) of protocol bridge 120 without sending the data packets to user space (not shown) for processing. The recomposed data packets are then sent to their respective destinations through the other session.

Figure 2:
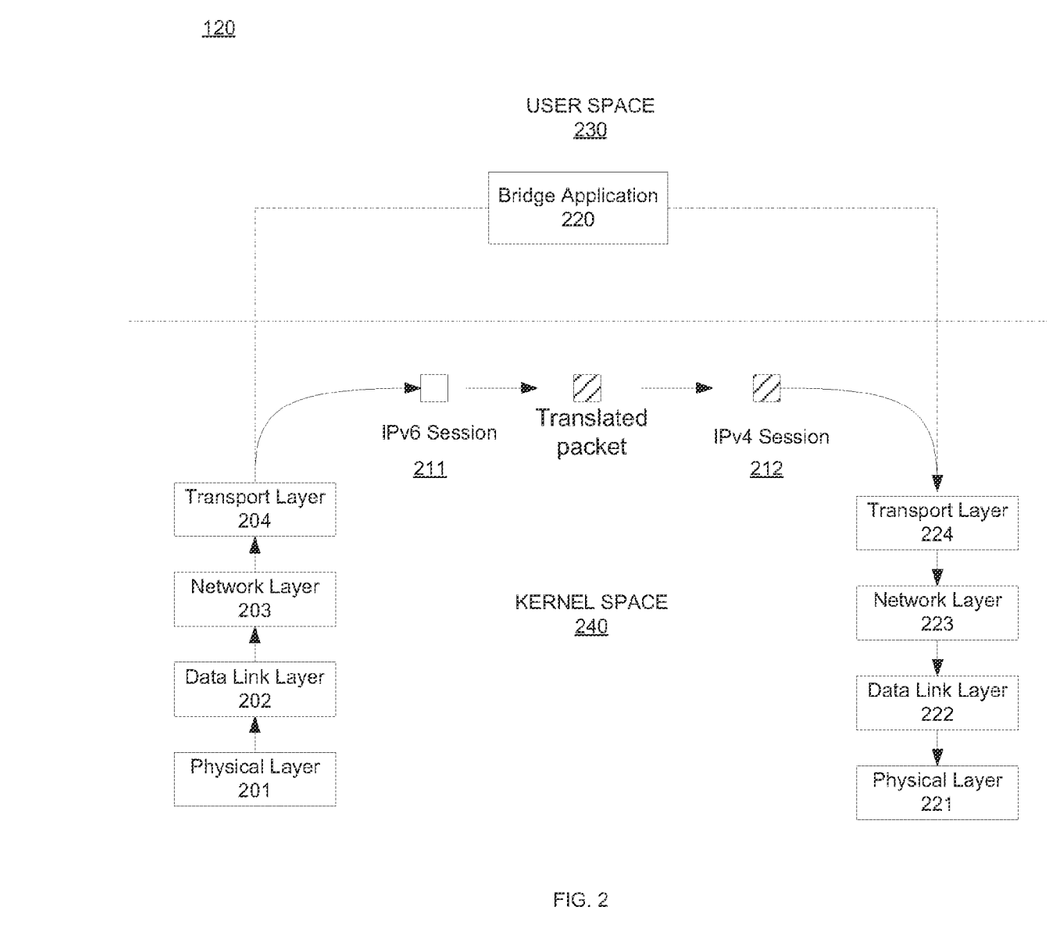
FIG. 2 illustrates bridging packets between an IPv6 session and an IPv4 session in accordance with an embodiment of the present invention.

FIG. 2 illustrates bridging packets between an IPv6 session 211 and an IPv4 session 212 in a kernel space 240 of a protocol bridge 120 in accordance with an embodiment of the present invention. In the context of the present example, protocol bridge 120 as shown in FIG. 1, comprises a software system/environment (e.g., an operating system) that is divided into kernel space 240 and user space 230. NAT64/46 operations in kernel space 240 will be described below.

IPv6 session 211 is set up to connect protocol bridge 120 and an IPv6 network device (e.g., host 111 as shown in FIG. 1). IPv4 session 212 is set up to connect protocol bridge 120 and an IPv4 network device (e.g., host 131 as shown in FIG. 1). The network session 211 and 212 may be used for any network protocols, such as User Datagram Protocol (UDP), Transmission Control Protocol (TCP) and Internet Control Message Protocol (ICMP). When an IPv6 data packet is received by protocol bridge 120 over an IPv6 network from an IPv6 network device, such as host 111, the IPv6 packet will pass in an upward direction through an IPv6 protocol stack of protocol bridge 120 including a physical layer 201, a data link layer 202, a network layer 203 and a transport layer 204. After the IPv6 data packet is received in kernel space 240, protocol bridge 120 creates a new session in an IPv6 session table (not shown) if the data packet is the first one between the IPv6 host and the IPv4 host. The IPv6 data packet is then translated into an IPv4 data packet in kernel space 240. Protocol bridge 120 passes the IPv4 data packet in a downward direction through layers of the IPv4 protocol stack, including a transport layer 224, a network layer 223, a data link layer 222 and a physical layer 221. The IPv4 protocol stack creates an IPv4 session in an IPv4 session table (not shown) and each layer of the protocol stack is used for performing a specific function, e.g., addressing, routing, framing and physical transmission of packets. The IPv4 data packet is then sent out to the destination through the IPv4 network. The management of sessions in a TCP/IP protocol stack is well known in the art and hence further description thereof will be omitted for brevity.

At the top of the stack, a bridge application 220 running in user space 230 can provide network address translation related service and other services, such as load balancing, deep content inspection and the like. The packet may be processed by bridge application 220 if additional processing is to be performed after a data packet received from one session is transmitted to the other based on rules of protocol bridge 120.

Figure 3A:
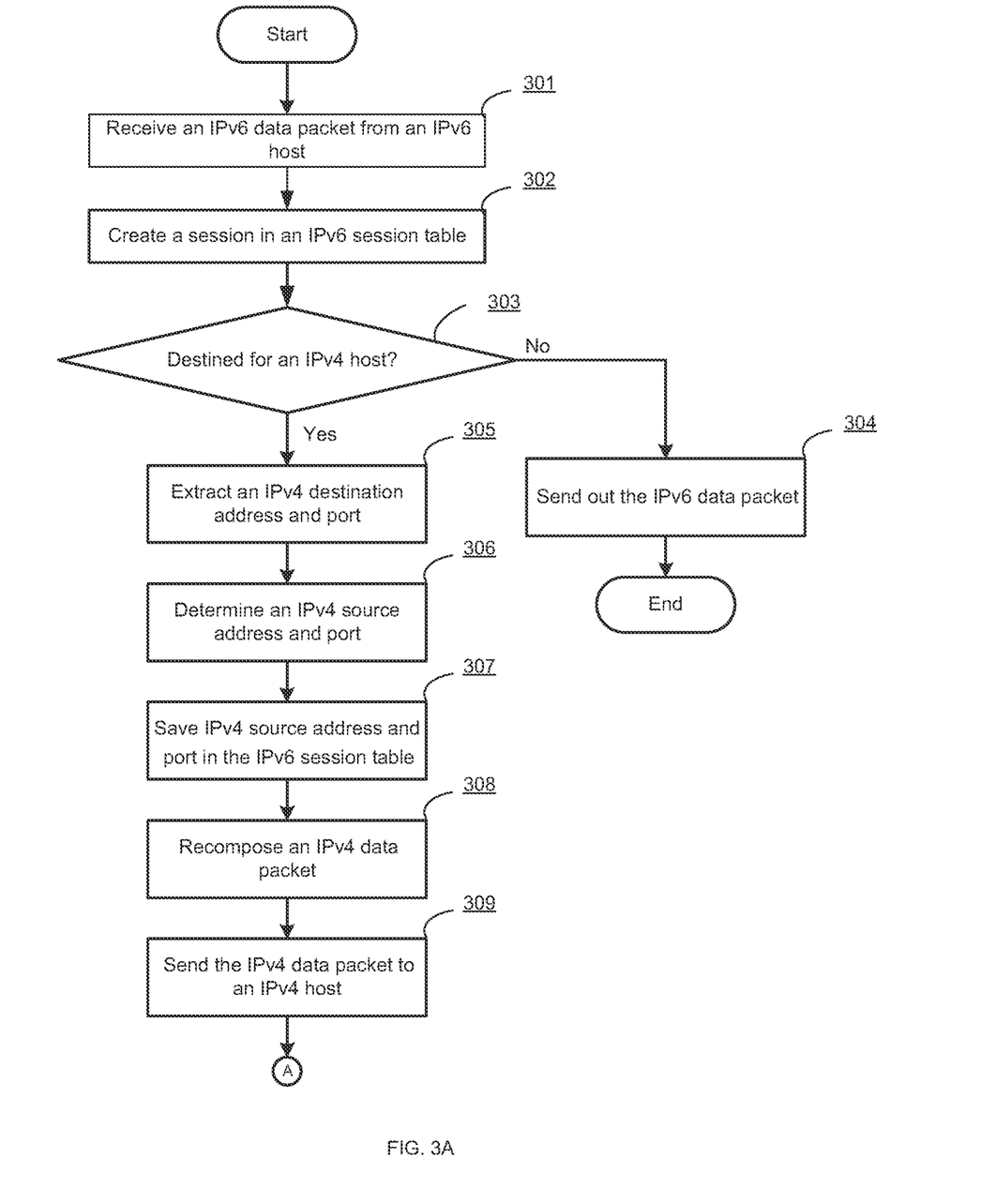
FIGS. 3A and 3B are flow diagrams illustrating a process for bridging packets exchanged among IPv4 network appliances and IPv6 network appliances in accordance with an embodiment of the present invention.
Figure 3B:
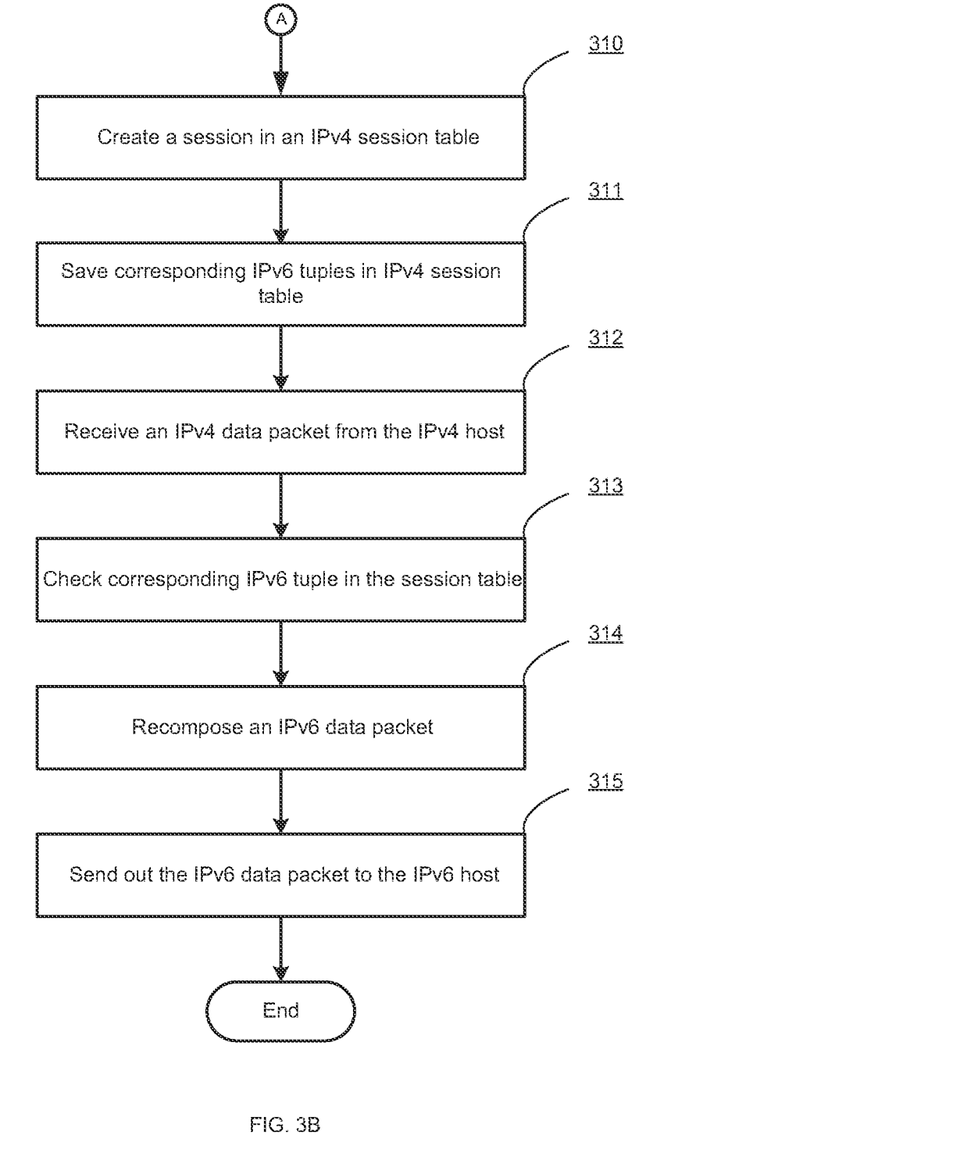

FIGS. 3A and 3B are flow diagrams illustrating a process for bridging packets exchanged among IPv4 network appliances and IPv6 network appliances in accordance with an embodiment of the present invention.

At block 301, a protocol bridge (e.g., protocol bridge 120 of FIGS. 1 and 2), receives an IPv6 data packet from an IPv6 client that connects to the protocol bridge through an IPv6 network. The IPv6 data packet is received by one of the NICs of the protocol bridge that is configured to support IPv6. When an IPv6 client tries to communicate with an IPv4 host, the IPv6 client usually sends a DNS query for a domain name of the IPv4 host to a domain name server 64 (DNS64). The DNS64 returns a synthetic AAAA resource record to the IPv6 client. The AAAA resource record contains an IPv6 address formed by a well-known prefix, such as 64:ff9b::, and the IPv4 address of the IPv4 host. After receiving the AAAA record, the IPv6 client may send an IPv6 data packet to the IPv6 address in the AAAA record and the IPv6 data packet will be routed to the protocol bridge. In the current example, the IP addresses of the IPv6 client, the protocol bridge and IPv4 host are as follows:

IPv6 client: 2001:db8::1
IPv4 host: 192.168.2.1
IPv6 Interface of protocol bridge: 64:ff9b::/96
IPv4 Interface of protocol bridge: 66.171.121.44

The 5-tuple in the IPv6 data packet header may include the following:

Source IP address: 2001:db8::1
Source port: 20000
Destination IP address: 64:ff9b::192.168.2.1
Destination port: 80
Protocol: HTTP At block 302, after the IPv6 data packet is received within the kernel space of the protocol bridge, a session is created in an IPv6 session table in the kernel space if the data packet is the first data packet of the IPv6 session. The IPv6 session table may contain the 5-tuple as shown above together with other session control information. Table 1a and 1b show the states of an IPv6 session table and an IPv4 session table after an IPv6 data packet is received.

TABLE 1a

| IPv6 session table after IPv6 data packet is received | | | | |
|---|---|---|---|---|
| Src IP, port v6 | Dst IP, port v6 | ... | Src IP, port v4 | Dst IP, port v4 |
| 2001:db8::1, 20000 | 64:ff9b::192.168.2.1, 80 | ... | | |

TABLE 1b

| IPv4 session table after IPv6 data packet is received (empty). | | | | |
|---|---|---|---|---|
| Src IP, port v4 | Dst IP, port v4 | ... | Src IP, port v6 | Dst IP, port v6 |

At block 303, the protocol bridge may determine if the IPv6 data packet is to be routed to an IPv4 host. In the present example, the protocol bridge may determine if a well-known prefix, such as 64:ff9b::, is contained in the IPv6 destination address.

If no well-known prefix is contained in the IPv6 destination address, the process goes to block 304. At block 304, the data packet is routed to its IPv6 destination without performing the NAT64 process.

If a well-known prefix is detected in the IPv6 destination address, the process goes to block 305. At block 305, the IPv4 destination address contained in the IPv6 destination address is extracted. The destination port is also extracted from the header of the IPv6 data packet.

At block 306, an IPv4 address and an unused port number that will be used as source IP address and port number of the IPv4 session are determined based on a NAT64 policy configured by the administrator of the protocol bridge. The NAT64 policy may define a rule specifying how an IPv6 data packet will be handled by the protocol bridge. The rule may include source interface, source address, destination interface, destination address, action, NAT mode and etc. The action may include ACCEPT or DENY. When the received IPv6 data packet matches the source interface, source address, destination interface, destination address and other conditions defined in the rule, the data packet may be accepted or denied accordingly. The NAT mode may determine the source IP address and port number of the IPv4 session that corresponds to the received IPv6 session. The source IP address of the IPv4 session may use the destination interface address or use an IP address from a dynamic IP address pool. The port number of the IPv4 session may use a random unused port or use a fixed port. If the NAT mode is set to using destination interface address, the IPv4 address of the destination interface (i.e. 66.171.121.44 in the present example) is selected for translation of the IPv6 source address to an IPv4 source address. If the NAT mode is set to selecting from the IP pool, then an IPv4 address from an IPv4 pool is selected for network address translation. If the NAT mode specifies a fixed port is set, then the selected fixed port will be used in connection with the network address translation. Otherwise, an unused port will be selected and used for the NAT64 process.

At block 307, the IPv4 tuple that is determined as above is saved in the IPv6 session table. In a conventional network stack of a NAT64, an IPv6 session table is maintained for managing the IPv6 session between the protocol bridge and IPv6 hosts. The IPv6 session table contains only IPv6 tuples of IPv6 sessions. In the present example, the IPv6 session table, which is used for managing the IPv6 session in the protocol stack in the kernel, may be extended to incorporate tuples of corresponding IPv4 sessions. By extending the IPv6 session table to incorporate corresponding IPv4 tuples, the corresponding IPv4 session tuples may be found directly from the IPv6 session table when further IPv6 data packets of the same IPv6 session are received by protocol bridge. Therefore, it is not necessary to go through the process of checking the network address translation policies again to determine the corresponding IPv4 address as described above with reference to blocks 305 and 306. After the corresponding IPv4 tuple is saved in the IPv6 session table, the IPv6 session table will be in a state as shown in Table 2a and the IPv4 session table will be in a state as shown in Table 2b.

TABLE 2a

| IPv6 session table after IPv4 tuple is saved | | | | |
|---|---|---|---|---|
| Src IP, port v6 | Dst IP, port v6 | ... | Src IP, port v4 | Dst IP, port v4 |
| 2001:db8::1, 20000 | 64:ff9b::192.168.2.1, 80 | ... | 66.171.121.44, 15000 | 192.168.2.1, 80 |

TABLE 2b

| IPv4 session table after IPv4 tuple is saved to IPv6 session table (empty). | | | | |
|---|---|---|---|---|
| Src IP, port v4 | Dst IP, port v4 | ... | Src IP, port v6 | Dst IP, port v6 |

In block 308, the protocol bridge translates the IPv6 header into an IPv4 header and an IPv4 data packet is recomposed based on the determined IPv4 tuple. The translation of an IPv6 header to an IPv4 header may use an IP/ICMP Translation Algorithm described in RFC 6145, which is hereby incorporated by reference in its entirety for all purposes, but which is not included inline for sake of brevity. In the present example, the 5-tuple of the recomposed IPv4 data packet is:

Source IP address: 66.171.121.44
Source port: 15000
Destination IP address: 64:ff9b::192.168.2.1
Destination port: 80
Protocol: HTTP At block 309, the recomposed IPv4 data packet is sent to the IPv4 protocol stack for transmission to its destination through the IPv4 NIC of the protocol bridge. The procedure that an IPv4 data packet goes through as it traverses the IPv4 protocol stack and is transmitted through an IPv4 NIC has been described above with reference to FIG. 2.

At block 310, an IPv4 session is created in the IPv4 session table when the recomposed IPv4 data packet goes through the IPv4 protocol stack. The state of the IPv4 session table, after the IPv4 data packet is sent, is shown in Table 3 in which the 5-tuple of the IPv4 session is recorded.

TABLE 3

| IPv4 session table after IPv4 session is established. | | | | |
|---|---|---|---|---|
| Src IP, port v4 | Dst IP, port v4 | ... | Src IP, port v6 | Dst IP, port v6 |
| 66.171.121.44, 15000 | 192.168.2.1, 80 | | | |

At block 311, the protocol bridge saves the corresponding IPv6 tuples in the IPv4 session table. In a conventional network stack of a NAT64 protocol bridge, an IPv4 session table that contains only IPv4 session tuples is maintained by the protocol bridge. The protocol bridge also maintains a separate session mapping table for managing the mapping of the IPv6 and IPv4 sessions. The session mapping table may comprise IPv6 tuples of IPv6 sessions and IPv4 tuples of corresponding IPv4 sessions. Each protocol, such as TCP, UDP and ICMP, may have its own session mapping table. A detailed description of management of session mapping tables is provided in RFC 6146, which is incorporated by reference herein in its entirety for all purposes, but which is not included inline for sake of brevity. In the present example, the IPv4 session table, which is used for managing the IPv4 session in the protocol stack in the kernel, may be extended to incorporate tuples of corresponding IPv6 sessions. The IPv4 session table, which is used for managing the IPv4 session in the protocol stack in the kernel, may also be extended to incorporate tuples of corresponding IPv6 sessions. By extending the IPv4 and/or IPv6 session tables to incorporate tuples of corresponding sessions, the corresponding tuples of the original session may be found by searching the session table of the return session when an IPv4/IPv6 response is returned to the protocol bridge as described further below with reference to block 313. The state of the IPv4 session table, after the tuple information of the corresponding original IPv6 session is incorporated, is shown in Table 4.

TABLE 4

IPv4 session table after IPv6 tuples are filled in.

| Src IP, port v4 | Dst IP, port v4 | Src IP, ... port v6 | Dst IP, port v6 |
| --- | --- | --- | --- |
| 66.171.121.44, 15000 | 192.168.2.1, 80 | 64:ff9b::192.168.2.1, 80 | 2001:db8::1, 20000 |

In Table 4, the source IPv6 address and the destination IPv6 address are inverse to that of the original IPv6 session shown in Table 1 so that IPv6 tuples retrieved from the IPv4 session table may be used directly in translating the IPv4 header to IPv6 header when IPv4 response is received.

Blocks 312-315 show processing in the response direction when an IPv4 data packet to the original IPv6 data packet is received by the protocol bridge via the IPv4 session.

At block 312, an IPv4 response data packet is received by the IPv4 NIC of the protocol bridge from the IPv4 host. The IPv4 data packet is sent to the IPv4 session in the kernel space of the protocol bridge. In the present example, the 5-tuple of the returned IPv4 data packet is as follows:
Source IP address: 192.168.2.1
Source port: 80
Destination IP address: 66.171.121.44
Destination port: 15000
Protocol: HTTP At block 313, the protocol bridge may check the IPv4 session table to find the tuple of the corresponding IPv6 session in the kernel space without sending the packet to the user space. In the present example, tuple information of the corresponding IPv6 session is saved to the IPv4 session table when the original IPv4 data packet is sent out. Therefore, the IPv4 session table is also operating as a session mapping table. The protocol bridge may search the IPv4 table as shown in Table 4 based on the tuple information of the returned IPv4 data packet as shown above. Then, tuple information of the corresponding IPv6 session may be retrieved from the IPv4 session table, such as source IPv6 address/port (64:ff9b::192.168.2.1,80) and destination IPv6 address/port (2001:db8::1,20000).

At block 314, the IPv4 header is translated into an IPv6 header based on the tuple information retrieved from the IPv4 session table. Since the source IPv6 address/port and destination IPv6 address/port are inverse to that of the original IPv6 session, the retrieved tuple information of IPv6 session may be used directly in translating the returned IPv4 header into an IPv6 header. An IPv6 data packet is then recomposed for the returned IPv4 data packet. The translation and recomposing of an IPv4 data packet to an IPv6 data packet may use an IP/ICMP Translation Algorithm as described in RFC 6145, which is hereby incorporated by reference in its entirety for all purposes, but which is not included inline for sake of brevity.

At block 315, the recomposed IPv6 data packet is sent to the IPv6 protocol stack and transmitted to its destination through the IPv6 NIC of the protocol bridge.

In the present example, the NAT64 procedure that allows an IPv6 client to access an IPv4 host is described. It will be apparent to one skilled in the art that the present invention may also be used in a NAT46 procedure that allows an IPv4 client to access an IPv6 host. Further, while both the system IPv4 session table and the system IPv6 session table are extended to maintain corresponding tuple information of the session of the other protocol in the present example, it will be apparent to one skilled in the art that only one of these system session tables may be extended. The extended session table may be used as a session mapping table for looking up tuple information for a corresponding session in another protocol.

Figure 4:
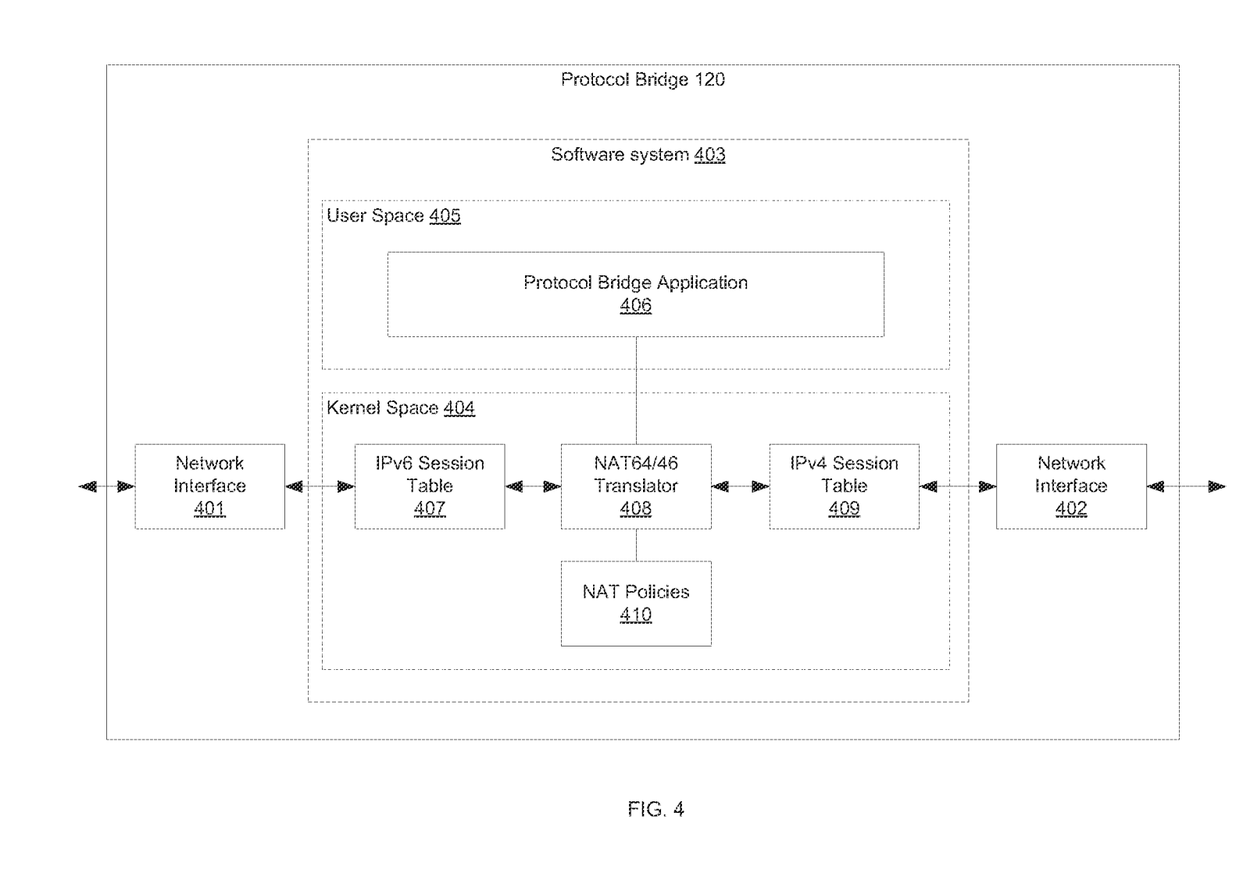
FIG. 4 illustrates example modules of a protocol bridge in accordance with an embodiment of the present invention.

FIG. 4 illustrates example modules of a protocol bridge 120 in accordance with an embodiment of the present invention. In the example, protocol bridge 120 includes a network interface 401, a network interface 402 and a software system 403. Network interface 401 is configured for connecting to an IPv6 network and network interface 402 is configured for connecting to an IPv4 network. Software system 403 is used for managing the hardware of protocol bridge 120 and providing NAT64/46 services to the IPv6 network and IPv4 network. Software system 403 may divide the system memory of protocol bridge into a kernel space 404 and a user space 405. Kernel space 404 is typically reserved memory for running the kernel and extensions to the kernel of an operating system and processes running in kernel space 404 have every privilege. User space 405 is typically the virtual memory region for running user applications and processes running in user space 403 may have normal privileges.

In user space 405, protocol bridge application 406 is configured for running in user space 405 and provides functions, including, but not limited to, managing NAT64/46 related policies and providing a user interface to users for configuring the protocol bridge. Protocol bridge application 406 may execute Unified Threat Management (UTM) functions, including, but not limited to one or more of firewall, IPS, malware scanning, data leak prevention (DLP), before or after performing NAT64/46 processing of data packets in kernel space 404.

In kernel space 404, an IPv6 session table 407 is configured for managing all sessions between IPv6 hosts and protocol bridge 120. When network interface 401 receives an IPv6 data packet from an IPv6 host, protocol bridge 120 may search IPv6 session table 407 based on the 5-tuple of the IPv6 data packet. If the IPv6 data packet is the first data packet of a session and no entry is found in the IPv6 session table, an entry is created in IPv6 session table 407 in which the 5-tuple of the new IPv6 session together with other session control information (e.g., session ID and timeout period) are stored. In the present example, IPv6 session table 407 also is extended for storing IPv4 tuple information of corresponding IPv4 sessions. In the original direction that IPv6 requests are received in an IPv6 session and will be transferred to an IPv4 host in an IPv4 session by protocol bridge 120, the IPv4 tuple information stored in IPv6 session table 407 may be used for translating headers of IPv6 data packets after the first IPv6 data packet of the IPv6 session into headers of IPv4 data packets that are to be sent to the IPv4 host in a corresponding IPv4 session. In the reply direction in which IPv6 responses are received in an IPv6 session and will be sent back to an IPv4 host in a corresponding IPv4 session, the IPv4 tuple information stored in the IPv6 session table 407 may be used for looking up corresponding IPv4 session on which the response will be sent back to the IPv4 hosts. As discussed above, the source IPv4 address and destination IPv4 address stored in the IPv6 session table may be inverse to that of the corresponding IPv4 session stored in the IPv4 session table (which allows tuples retrieved from the IPv4 session table to be used directly in connection with performing header translation).

Similarly, an IPv4 session table 409 is configured for managing all sessions between IPv4 hosts and protocol bridge 120. When network interface 402 receives an IPv4 data packet from an IPv4 host, protocol bridge 120 may search IPv4 session table 409 based on the 5-tuple of the IPv4 data packet. If the IPv4 data packet is the first data packet of a session and no entry is found in the IPv4 session table, an entry is created in IPv4 session table 409 in which the 5-tuple of the new IPv4 session together with other session control information are stored. In the present example, IPv4 session table 409 also is extended to accommodate IPv6 tuple information of corresponding IPv6 sessions. In the original direction that IPv4 requests are received in an IPv4 session and will be transferred to an IPv6 host in an IPv6 session by protocol bridge 120, the IPv6 tuple information stored in IPv4 session table 409 may be used for translating headers of IPv4 data packets after the first IPv4 data packet of the IPv4 session into headers of IPv6 data packets that are to be sent to the IPv6 host in a corresponding IPv6 session. In the reply direction that IPv4 responses are received in the IPv4 session and will be sent back to the IPv6 host in the corresponding IPv6 session, the IPv6 tuple information stored in the IPv4 session table 409 may be used for looking up the corresponding IPv6 session on which the response will be sent back to the IPv6 hosts. As discussed above, the source IPv6 address and destination IPv6 address stored in the IPv4 session table may be inverse to that of the corresponding IPv6 session stored in the IPv6 session table (which allows tuples retrieved from the IPv6 session table to be used directly in connection with performing header translation).

NAT64/46 translator 408 is used for translating received IPv6 data packets into IPv4 data packets or vice versa based on NAT policies 410. NAT policies 410 may be defined by the administrator of protocol bridge 120 to control actions where data packets are received by protocol bridge 120 and how the protocol is translated. The policies may include, but are note limited to, NAT modes, IP address pool and traffic control rules. NAT64/46 translation algorithm described in RFC 6145 may be used for translating the IP addresses and recomposing the headers of data packets. The translated data packets are then sent to the corresponding protocol stack for transmission to their destination.

Figure 5:
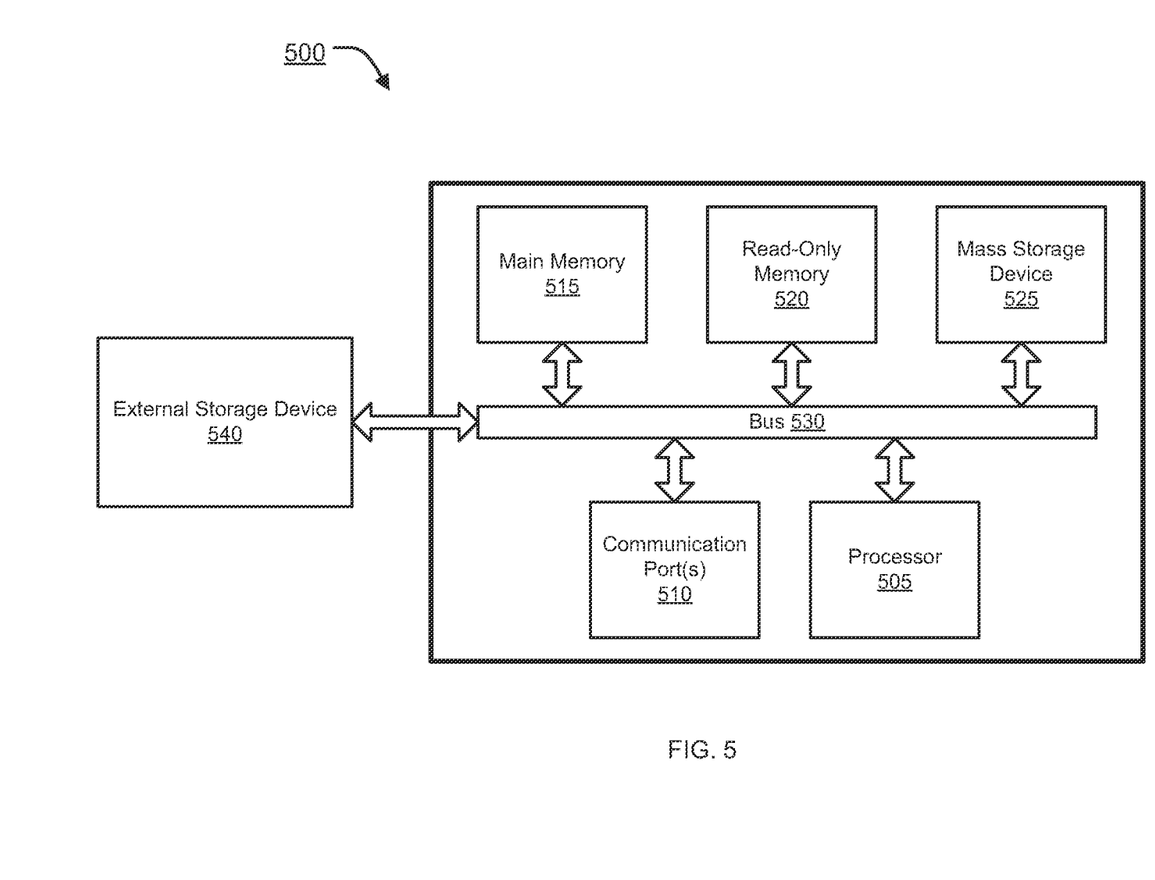
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a protocol bridge (e.g., protocol bridge 120), a network appliance, a server or a client workstation. Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports. Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention. Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects. Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505. Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc. Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to software system. Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510. Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:

receiving, by a protocol bridge connecting a first network, configured for operation in accordance with a first protocol, and a second network, configured for operation in accordance with a second protocol, a data packet via a first session of the first protocol from a first network appliance of the first network, wherein the first protocol comprises Internet Protocol version 4 (IPv4) or Internet Protocol version 6 (IPv6), and wherein the protocol bridge comprises an operating system that is divided into a kernel space and a user space;

retrieving, by the protocol bridge, a network address translating policy from a protocol bridge application running in the user space of the protocol bridge; wherein the network address translating policy includes a rule for translating the first protocol to the second protocol;

translating, by the protocol bridge, the data packet into the second protocol based on the network address translating policy, wherein the second protocol comprises Internet Protocol version 4 (IPv4) or Internet Protocol version 6 (IPv6) and is different from the first protocol, and the translating is performed in the kernel space of the protocol bridge without sending the data packet to the user space of the protocol bridge; and transmitting, by the protocol bridge, the data packet via a second session of the second protocol to a second network appliance of the second network.

2. The method of claim 1, further comprising:

maintaining, by the protocol bridge, a first session table in which tuple information is stored for the first session between the first network appliance and the protocol bridge; and maintaining, by the protocol bridge, a second session table in which tuple information is stored for the second session between the second network appliance and the protocol bridge;

wherein the first session table is also configured to store tuple information for the second session corresponding to the tuple information for the first session.

3. The method of claim 2, further comprising:

calculating corresponding tuple information of the second session based on the tuple information of the first session; and storing the corresponding tuple information of the second session in the first session table.

4. The method of claim 3, wherein said calculating corresponding tuple information of the second session based on the tuple information of the first session further comprises extracting an IPv4 address of the second network appliance from a destination IPv6 address of the first session.

5. The method of claim 2, further comprising:

searching the corresponding tuple information of the second session from the first session table when a data packet of the first protocol is received;

when the corresponding tuple information of the second session is found in the first session table, recomposing a data packet of the second protocol based on the tuple information of the second session founded from the first session table.

6. The method of claim 2, wherein the first session table and the second session table are used for managing sessions under multiple transmission protocols.

7. The method of claim 6, wherein the multiple transmission protocols comprise transmission control protocol (TCP), user datagram protocol (UDP) and internet control message protocol (ICMP).

8. The method of claim 2, wherein said translating, by the protocol bridge, the data packet into the second protocol further comprises:

when the first session in which the data packet is received is IPv6 and the second session in which the data packet is sent is IPv4:

selecting an IPv4 address from an IP address pool and an unused port as a source transport address and source port, respectively, of the second session;

extracting an IPv4 address and a port from an IPv6 destination address and a port of the first session as a destination transport address and destination port, respectively, of the second session; and translating an IPv6 header of the data packet into an IPv4 header using the source transport address, the source port, the destination transport address and the destination port of the second session.

9. The method of claim 2, wherein tuple information of the second session stored in the second session table comprises a source IP address and a destination IP address of the second protocol and the tuple information of the second session stored in the first session table comprises a source IP address and a destination IP address of the second protocol; and wherein the source IP address and destination IP address of the second protocol stored in the second session table are in a reverse order to the source IP address and destination IP address of the second protocol stored in the first session table.

10. The method of claim 2, wherein the first session table comprises a system session table that is configured for managing sessions of the first protocol and is extended to maintain tuple information of corresponding sessions of the second protocol.

11. The method of claim 2, wherein the second session table comprises a system session table that is configured for managing sessions of the second protocol and is extended to maintain tuple information of corresponding sessions of the first protocol.

12. The method of claim 1, further comprising:

configuring, by the protocol bridge, the network address translating policy for controlling translation of the first protocol into the second protocol at the protocol bridge application; and configuring, by the protocol bridge, a policy for controlling an action to be taken on the data packet after the data packet is received by the protocol bridge at the protocol bridge application.

13. A protocol bridge device logically interposed between a first network, configured for operation in accordance with a first protocol, and a second network, configured for operation in accordance with a second protocol, and wherein the protocol bridge comprises an operating system that is divided into a kernel space and a user space, the protocol bridge comprising:

a non-transitory storage device having tangibly embodied therein instructions representing a network address translation application; and one or more processors coupled to the non-transitory storage device and operable to execute the network address translation application to perform a method comprising:

receiving a data packet via a first session of the first protocol from a first network appliance of the first network, wherein the first protocol comprises Internet Protocol version 4 (IPv4) or Internet Protocol version 6 (IPv6);

translating the data packet into the second protocol, wherein the second protocol comprises Internet Protocol version 4 (IPv4) or Internet Protocol version 6 (IPv6) and is different from the first protocol, and the translating is performed in the kernel space of the protocol bridge without sending the data packet to the user space of the protocol bridge; and transmitting the data packet via a second session of the second protocol to a second network appliance of the second network.

14. The protocol bridge device of claim 13, wherein the method further comprises:

maintaining a first session table in which tuple information is stored for the first session between the first network appliance and the protocol bridge; and maintaining a second session table in which tuple information is stored for the second session between the second network appliance and the protocol bridge;

wherein the first session table is also configured to store tuple information for the second session corresponding to the tuple information for the first session.

15. The protocol bridge device of claim 14, wherein the method further comprises:

calculating corresponding tuple information of the second session based on the tuple information of the first session; and storing the corresponding tuple information of the second session in the first session table.

16. The protocol bridge device of claim 15, wherein said calculating corresponding tuple information of the second session based on the tuple information of the first session further comprises extracting an IPv4 address of the second network appliance from a destination IPv6 address of the first session.

17. The protocol bridge device of claim 14, wherein the method further comprises:

searching the corresponding tuple information of the second session from the first session table when a data packet of the first protocol is received;

when the corresponding tuple information of the second session is found in the first session table, recomposing a data packet of the second protocol based on the tuple information of the second session founded from the first session table.

18. The protocol bridge device of claim 14, wherein the first session table and the second session table are used for managing sessions under multiple transmission protocols.

19. The protocol bridge device of claim 18, wherein the multiple transmission protocols comprise transmission control protocol (TCP), user datagram protocol (UDP) and internet control message protocol (ICMP).

20. The protocol bridge device of claim 14, wherein said translating, by the protocol bridge, the data packet into the second protocol further comprises:

when the first session in which the data packet is received is IPv6 and the second session in which the data packet is sent is IPv4:

selecting an IPv4 address from an IP address pool and an unused port as a source transport address and source port, respectively, of the second session;

extracting an IPv4 address and a port from an IPv6 destination address and a port of the first session as a destination transport address and destination port, respectively, of the second session; and translating an IPv6 header of the data packet into an IPv4 header using the source transport address, the source port, the destination transport address and the destination port of the second session.

21. The protocol bridge device of claim 14, wherein tuple information of the second session stored in the second session table comprises a source IP address and a destination IP address of the second protocol and the tuple information of the second session stored in the first session table comprises a source IP address and a destination IP address of the second protocol; and wherein the source IP address and destination IP address of the second protocol stored in the second session table are in a reverse order to the source IP address and destination IP address of the second protocol stored in the first session table.

22. The protocol bridge device of claim 14, wherein the first session table comprises a system session table that is configured for managing sessions of the first protocol and is extended to maintain tuple information of corresponding sessions of the second protocol.

23. The protocol bridge device of claim 14, wherein the second session table comprises a system session table that is configured for managing sessions of the second protocol and is extended to maintain tuple information of corresponding sessions of the first protocol.

24. The protocol bridge device of claim 13, wherein the method further comprises:

configuring a network address translating policy for controlling translation of the first protocol into the second protocol; and configuring a policy for controlling an action to be taken on the data packet after the data packet is received.

* * * * *